Patented Sept. 27, 1932

1,879,210

UNITED STATES PATENT OFFICE

HANS HAHL, OF ELBERFELD, GERMANY, ASSIGNOR TO WINTHROP CHEMICAL COMPANY INC., OF NEW YORK, N. Y., A CORPORATION OF NEW YORK

PYRAZOLE DERIVATIVES

No Drawing. Application filed April 15, 1929, Serial No. 355,435, and in Germany April 28, 1928.

The present invention relates to new pyrazole derivatives having valuable pharmacological properties.

I have found that pyrazole derivatives of the probable general formula:

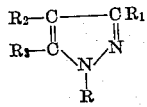

wherein R stands for hydrogen, methyl, alkylaminoalkyl, phenyl or phenylalkyl, $R_1$ and $R_3$ means alkyl-groups containing at least two carbon atoms, $R_2$ represents hydrogen or an alkyl group have strong narcotic and generally also analgetic properties, surpassing those of the known 3.5-dimethylpyrazole and its derivatives.

The new compounds may be prepared for instance by reacting upon dipropionylmethane or homologues or derivatives thereof with a suitable hydrazine compound such as hydrazine, hydrazine-hydrate, methylhydrazine, phenylhydrazine and the like according to the methods known for the production of pyrazole derivatives from 1.3-diketones and hydrazine compounds. Furthermore such pyrazole derivatives as still contain a free imino-group can be transformed into their N-substituted alkyl, phenylalkyl or alkylaminoalkyl derivatives by reacting upon the former with an alkyl iodide (benzyl-chloride, an alkylaminoalklhalogenide or the like, according to the usual methods.

The compounds thus obtainable form colorless to pale yellow colored liquid or crystallized substances of strong basic properties yielding well crystallizing salts with mineral acids.

The following examples illustrate my invention, without limiting it thereto, the parts being by weight:

*Example 1.*—40 parts of dipropionylmethane and 16 parts of hydrazinehydrate, or the corresponding quantity of a hydrazine salt and an alkali, are heated with 300 parts of alcohol in the water bath for about 5-6 hours. After that time the reaction mixture is distilled in vacuo, whereby the 3.5-diethylpyrazole distils over at a pressure of 9 mm. and at a temperature between 119-122° C. as a colorless oil, which solidifies after cooling in form of colorless radiated crystals. The new compound, which probably corresponds to the formula:

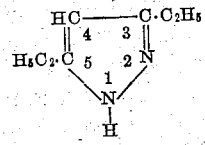

is easily soluble in ether, more difficultly soluble in water and has valuable narcotic and analgetic properties.

*Example 2.*—20 parts of ethyl-dipropionylmethane

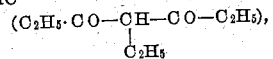

6,5 parts of hydrazinhydrate and 200 parts of alcohol are heated in the water bath for about 3-4 hours. When distilling the mixture at a pressure of 10 mm., the 3.4.5-triethylpyrazole distils over between about 138-142° C. in form of a colorless oil, yielding colorless crystals on cooling.

*Example 3.*—20 parts of dipropionylmethane are heated with 17 parts of phenylhydrazine in the water bath for about 4-5 hours. The 3.5-diethyl-1-phenylpyrazole formed distils from the reaction mixture at a pressure of 9 mm. between 149-151° C. in form of a yellowish oil, yielding a well crystallizing salt with hydrochloric acid.

*Example 4.*—20 parts of 3.5-diethylpyrazole and 25 parts of diethylaminoethylchloride are heated to about 90-100° C. until a uniform crystal magma has been formed, which is dissolved in water and extracted with ether. The remaining liquid is made alkaline, whereby the same separates into water and an oily layer, which latter is separated, dried and distilled at a pressure of 9 mm., whereby the compound of the probable formula

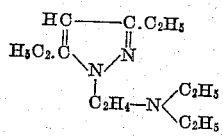

distils over in form of a colorless oil at 132–134° C. The base yields well crystallizing salts with mineral acids.

*Example 5.*—10 parts of 3.4.5-triethylpyrazole and 10.5 parts of methyliodide are heated together in a closed vessel to 120–130° C. for about 6–7 hours. The reaction product is dissolved in water, extracted with ether, and the remaining liquid is made alkaline, whereby the 1-methyl-3.4.5-triethylpyrazole separates as a colorless oil, which is separated from the aqueous layer, dried and distilled at a pressure of 10 mm. The new compound distils over at about 101–102° C.

I claim:

1. As new products the compounds of the probable general formula:

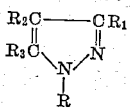

wherein R stands for hydrogen, methyl, alkylaminoalkyl, phenyl or phenylalkyl, $R_1$ and $R_3$ mean alkyl-groups containing at least two carbon atoms, $R_2$ represents hydrogen or an alkyl group, said compounds forming liquid or solid strong basic substances, having valuable pharmacological properties.

2. As a new product the compound of the probable formula:

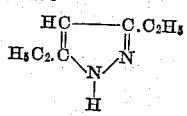

said compound forming colorless crystals easily soluble in ether, more difficultly soluble in water, having valuable narcotic and analgetic properties.

3. As new products the compounds of the probable general formula:

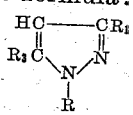

wherein R stands for alkylaminoalkyl, $R_1$ and $R_3$ stand for alkyl groups containing at least 2 carbon atoms, said compounds forming liquid of solid strong basic substances, having valuable pharmacological properties.

4. As new products the compounds of the probable general formula:

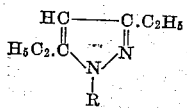

wherein R stands for an alkylaminoalkyl group, said compounds forming liquid or solid strong basic substances, having valuable pharmacological properties.

5. As a new product the compound of the probable formula:

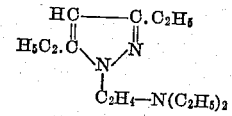

said compound boiling as a colorless oil at a pressure of 9 mm. at 132–134° C., yielding with mineral acids crystallizing salts, having pharmacological properties.

In testimony whereof I have hereunto set my hand.

HANS HAHL. [L. S.]